United States Patent
Garibay et al.

(10) Patent No.: US 9,710,395 B1
(45) Date of Patent: Jul. 18, 2017

(54) DYNAMIC ADDRESS TRANSLATION TABLE ALLOCATION

(71) Applicant: International Business Machines Corporation, Armonk, NY (US)

(72) Inventors: VIctor A. Garibay, Leander, TX (US); Daniel E. Hurlimann, Austin, TX (US); Chetan Mehta, Austin, TX (US); Travis J. Pizel, Rochester, MN (US); Fernando Pizzano, Poughkeepsie, NY (US); Thomas R. Sand, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/334,588

(22) Filed: Oct. 26, 2016

(51) Int. Cl.
  *G06F 12/10* (2016.01)
  *G06F 12/1081* (2016.01)
  *G06F 9/455* (2006.01)
  *G06F 12/1027* (2016.01)
  *G06F 13/28* (2006.01)

(52) U.S. Cl.
  CPC ...... *G06F 12/1081* (2013.01); *G06F 9/45558* (2013.01); *G06F 12/1027* (2013.01); *G06F 13/28* (2013.01); *G06F 2009/45583* (2013.01); *G06F 2212/657* (2013.01)

(58) Field of Classification Search
  CPC .... G06F 12/10; G06F 12/109; G06F 12/1009; G06F 13/28
  See application file for complete search history.

(56) References Cited

U.S. PATENT DOCUMENTS

| | | | |
|---|---|---|---|
| 7,076,634 B2* | 7/2006 | Lambeth | G06F 12/0284 711/206 |
| 9,092,365 B2* | 7/2015 | King | G06F 12/1081 |
| 9,104,600 B2* | 8/2015 | King | G06F 12/1081 |
| 9,146,863 B2 | 9/2015 | Brownlow et al. | |
| 9,330,037 B2* | 5/2016 | Guttahalli Krishna | G06F 13/28 |
| 2010/0228945 A1 | 9/2010 | Deshpande et al. | |
| 2012/0265916 A1 | 10/2012 | Nordstrom et al. | |

(Continued)

OTHER PUBLICATIONS

Disclosed Anonymously, "Method and system for efficient page table allocation"; IP.com Disclosure No. IPCOM000238062D, Jul. 30, 2014.

(Continued)

*Primary Examiner* — Brian Misiura
(74) *Attorney, Agent, or Firm* — Martin & Associates, LLC; Bret J. Petersen

(57) ABSTRACT

A system and method dynamically allocate address translation tables for direct memory access windows by donating logical memory blocks to allocate to the address translation tables. A dynamic address translation table allocation module dynamically changes the allocation of memory to the address translation tables without a platform or partition reboot. A portion of the dynamic address translation table allocation module may reside in the hypervisor and in the partition and communicate to dynamically allocate memory to the address translation tables. The dynamic address translation table allocation module in the partition may donate logical memory blocks to the hypervisor to increase the allocation of memory to the address translation tables.

12 Claims, 4 Drawing Sheets

(56) References Cited

U.S. PATENT DOCUMENTS

2015/0067224 A1* 3/2015 Arroyo ............... G06F 12/1009
710/308

OTHER PUBLICATIONS

Disclosed Anonymously, "Method and System for Direct Memory Access (DMA) to a Logical Partition Memory"IP.com Disclosure No. IPCOM000196520D, Jun. 4, 2010.

IBM, "Self Tuning Firmware Algorithm for Allocation of I/O Address Translation Tables," IP.com Disclosure No. IPCOM000022478D, Mar. 17, 2004.

* cited by examiner

DYNAMIC ADDRESS TRANSLATION TABLE ALLOCATION

BACKGROUND

1. Technical Field

This invention generally relates to address translation in a computing environment, and more specifically relates to dynamic address translation table allocation for a direct memory access (DMA) window without a platform or partition reboot.

2. Background Art

Address translation tables (ATTs) are used to provide security for main storage memory accesses by I/O adapters sometimes called DMA Windows. The ATT maps addresses used by the I/O adapter to do direct memory access (DMA) of main storage memory. The ATT holds address translation table entries (ATTE), where each entry consists of authority information (Read/Write) and main storage address information. A typical ATTE is at least 8 bytes in length, but other size entries could be used. Each ATTE maps to a page of main memory. The pages can be various sizes such as 4K, 64K, 1M, and 16M. There are also larger blocks of main memory used to manage the allocation of main memory. These larger blocks are sometimes called Logical Memory Blocks, or LMBs. The LMBs are used to divide up main storage memory into pieces that can be assigned to a hypervisor that manages logical partitions or to the logical partitions themselves.

The ATT must be accessible by the hardware to do translations and trusted firmware, such as a hypervisor, must be able to set up mappings when needed. Hence the ATT is typically in hypervisor storage memory. It is advantageous to limit memory used by the Hypervisor since any memory used by the hypervisor is memory that can't be used by partitions/users. Also, hypervisor storage memory typically must be allocated during platform initialization. There is a tradeoff between large ATT tables and small ATT tables. A large ATT table may allow all or nearly all of memory to be mapped to the I/O adapter but that will take too much memory. A small ATT uses less memory but may result in more overhead by the hypervisor while mapping and unmapping pages of memory. Further, determining the size of the DMA windows needed for each IO adapter at initialization time is very difficult.

BRIEF SUMMARY

An apparatus and method dynamically allocates address translation tables for direct memory access windows by donating logical memory blocks to allocate to the address translation tables. A dynamic address translation table allocation module dynamically changes the allocation of memory to the address translation tables without a platform or partition reboot. A portion of the dynamic address translation table allocation module may reside in the hypervisor and in the partition and communicate to dynamically allocate memory to the address translation tables. The dynamic address translation table allocation module in the partition may donate logical memory blocks to the hypervisor to increase the allocation of memory to the address translation tables.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein describe dynamically allocating address translation tables for direct memory access windows by donating logical memory blocks to allocate to the address translation tables without a platform or partition reboot. A dynamic address translation table allocation module dynamically changes the allocation of memory to the address translation tables. A portion of the dynamic address translation table allocation module may reside in the hypervisor and in the partition and communicate to dynamically allocate memory to the address translation tables. The dynamic address translation table allocation module in the partition may donate logical memory blocks to the hypervisor to increase the allocation of memory to the address translation tables.

Figure 1:
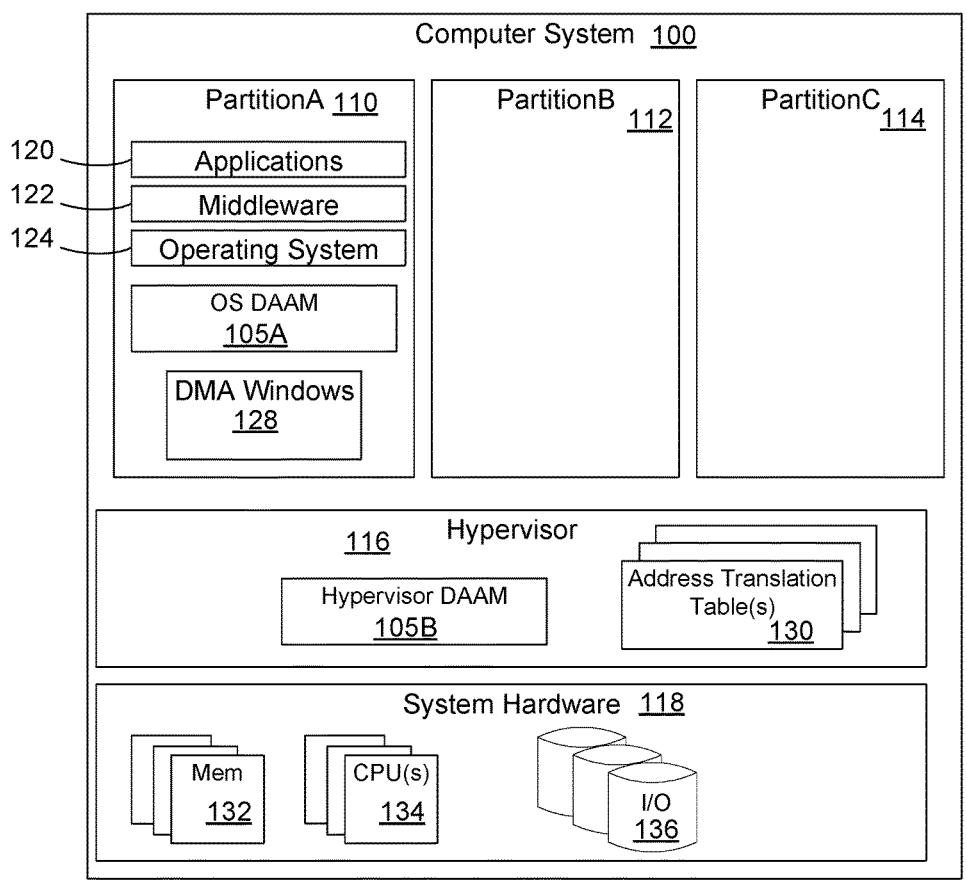
FIG. 1 is a block diagram that illustrates a computer system with a dynamic ATT allocation module (DAAM) for dynamically changing the allocation of memory to the address translation tables.

Referring now to FIG. 1, a block diagram illustrates a computer system 100 with a dynamic ATT allocation module (DAAM) for dynamically changing the allocation of memory used for address translation. The DAAM dynamically changes the address translation table allocation for a direct memory access (DMA) window during run time of the partition and after the platform or partition is initialized such that a reboot of the partition is not required after the allocation. In the illustrated example, the DAAM is made up of two parts the OS DAAM 105A and the hypervisor DAAM 105B, which are collectively referred to herein as DAAM 105. Computer system 100 may represent a computers system or server that is part of a cloud computing system, or may be a stand-alone host computer system. The computer system 100 may host one or more partitions or virtual machines. In the illustrated example, the computer system 100 hosts three partitions 110, 112, 114. PartitionA 110 includes applications 120, middleware 122, and operating system 124 in the manner as known in the prior art. PartitionA 110 further includes DMA windows 128. The DMA windows 128 is the memory assigned to the partition and accessible via DMA memory operations as known in the prior art. PartitionA 110 includes the operating system dynamic ATT allocation module (OS DAAM) 105A for dynamically changing the allocation of memory used for address translation as described herein. DAAM 105A thus is a portion of the DAAM 105 residing in a partition. In some implementations, the DAAM 105A may reside within the operating system 124. PartitionB 112 and PartitionC 114 may include the same components as shown for PartitionA 110.

Again referring to FIG. 1, in the illustrated example, the computer system 100 further includes a hypervisor 116. A hypervisor is one suitable example of partition manager system software that allocates and controls the partitions 110, 112 and 114. The hypervisor 116 runs on the computer system 100 and provides a virtual operating platform for virtual machines or logical partitions as known in the prior art. The hypervisor 116 also virtualizes the system hardware 118 to provide virtualized hardware resources to the partitions. The system hardware 118 may include memory 132, computer processing units 134 and I/O devices 136 as known in the prior art. The hypervisor 116 includes a portion of the DAAM shown here as DAAM 105B. The DAAM 105B in the hypervisor manages allocation of the address translation tables 130 as described further below.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
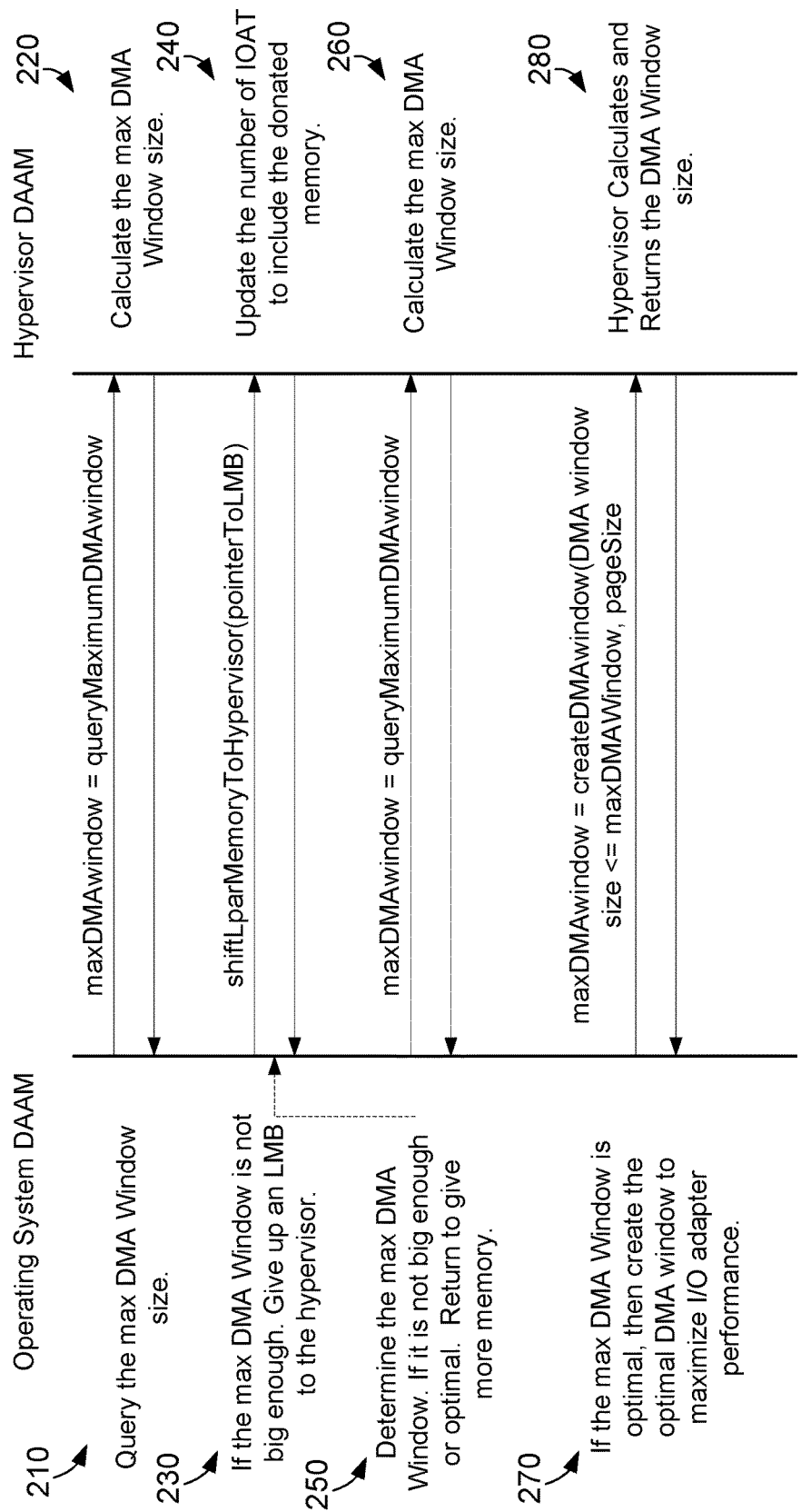
FIG. 2 is a signal flow diagram that illustrates handshake communication of the dynamic ATT allocation module for dynamically changing the allocation of memory to the address translation tables.

FIG. 2 represents a signal flow diagram that describes handshake communication of the dynamic ATT allocation module (DAAM) 105 for dynamically changing the allocation of memory to the address translation tables. The communication described in FIG. 2 takes place between the operating system and the hypervisor as shown in FIG. 1. In this example and throughout the description herein, references to actions taken by the operating system (OS) may be performed by the portion of the DAAM 105A located in or associated with the operating system 124 in PartitionA 110. Similarly, reference to actions taken by the hypervisor may be performed by the portion of the DAAM 105B residing in the hypervisor 116.

Again referring to FIG. 2 an example of dynamically changing the allocation of memory to the address translation tables is illustrated. In this example, the operating system (OS) queries the maximum DMA window size 210. The hypervisor calculates the maximum DMA window size and responds to the query to return the maximum DMA window size 220. The OS then determines whether the maximum DMA window size is big enough. If the maximum DMA window size is not big enough, then the OS gives up memory in the form of an LMB to the hypervisor 230. The hypervisor receives the donated LMB and updates the address translation tables to include the donated memory 240. The hypervisor may respond by returning a code that indicates whether is successfully updated the address translation tables with the memory. The OS then again queries the maximum DMA window size. The hypervisor recalculates the maximum DMA window size and returns this value to the OS. The OS determines whether the maximum DMA window size is now optimal 250. The hypervisor then calculates the max DMA window size 260. If the DMA window size is not optimal, the OS DAAM would return to repeat step 230 to send additional memory to the hypervisor. If the DMA window size is big enough or optimal, then the OS creates the optimal sized DMA window to maximize the I/O adapter performance by sending a request to the hypervisor to create a DMA window of the optimal size with the given page size 270. The hypervisor then creates the DMA window 280.

Again referring to FIG. 2, after the operating system (OS) queries the maximum DMA window size 210, the hypervisor calculates the maximum DMA window size and responds to the query to return the maximum DMA window size. The hypervisor calculates the maximum DMA window size by taking the number of address translation table entries (ATTEs) and multiplies by the largest page size in the manner known in the prior art. Similarly, the OS creates the optimal sized DMA window by sending a request to the hypervisor similar to the manner known in the prior art. The hypervisor creates a DMA window of the optimal size with the given page size where the given page size may or may not be the maximum page size. The hypervisor creates the DMA window using the additional memory donated by the OS to create an optimal DMA window that will maximize the I/O adapter performance as described herein.

The DMA window size may be considered optimal as determined by a device driver for an I/O adapter where the device driver dictates the max amount of memory that could be mapped simultaneously (i.e., X number of buffers/pages per port or N pages per request+Max # of requests, etc). Other metrics could also be used to determine optimization. Similarly, a determination of the system performance can be done in various ways. For example, performance could be determined by using past performance stored in a table to predict the performance with the current ATT size. Other performance metrics known in the art could also be used.

Figure 3:
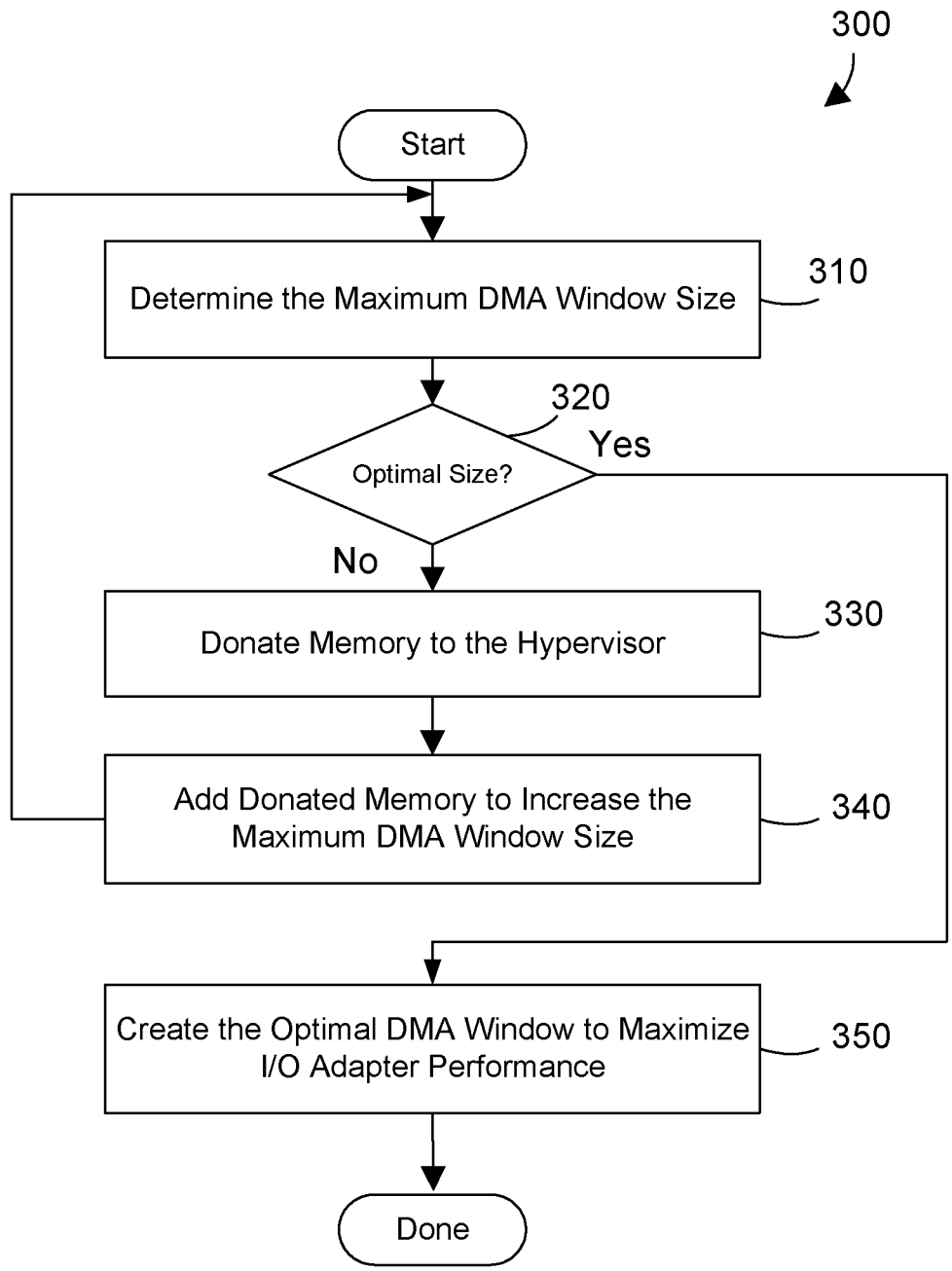
FIG. 3 is a flow diagram of a method for dynamically changing the allocation of memory to the address translation tables.

FIG. 3 illustrates a flow diagram of a method 300 for dynamically changing the allocation of memory to the address translation tables. The method 300 is presented as a series of steps performed by a computer software program such as the DAAM 105 described above. First, determine the maximum DMA window size (step 310). This can be done, for example, by the DAAM in the operating system querying the DAAM in the hypervisor, as shown in step 210 in FIG. 2. Determine if the DMA window size is an optimal size (step 320). If the DMA window size is not optimal (step 320=no) then donate memory to the hypervisor (step 330). Add the donated memory to increase the maximum DMA window size (step 340) and return to step 310. If the DMA window size is optimal (step 320=yes) then create the optimal DMA window to maximize I/O adapter performance (step 350). The method 300 is then done.

Figure 4:
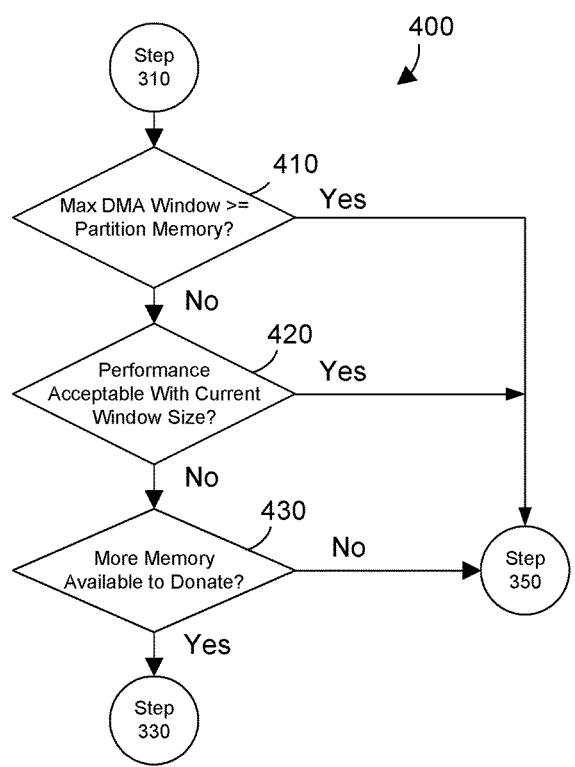
FIG. 4 is a flow diagram of an example method for step 320 in FIG. 3.

Referring now to FIG. 4, a flow diagram shows method 400 that is an exemplary method for performing step 320 in method 300 for dynamically changing the allocation of memory to the address translation tables. The method 400 is presented as a series of steps performed by a computer software program such as the DAAM 105 described above. First, determine if the maximum DMA window size is greater than or equal to partition memory (step 410). This is done to determine if the system can create an ATT to cover all of partition memory. If the maximum DMA window size is greater than or equal to partition memory (step 410=yes) then go to step 350. If the maximum DMA window size is not greater than or equal to partition memory (step 410=no) then determine if performance is acceptable with the current window size (step 420). If the performance is acceptable with the current window size (step 420=yes) then go to step 350. If the performance is not acceptable with the current window size (step 420=no) then determine whether there is more available memory that could be donated to the hypervisor (step 430). If there is more available memory that could be donated to the hypervisor (step 430=yes) then go to step 330. If there is no more memory to donate to the hypervisor (step 430=no) then go to step 350. The method 400 is then done.

The claims and disclosure herein provide an apparatus and method for dynamically allocating address translation tables (ATTs) for direct memory access (DMA) windows by donating logical memory blocks (LMBs) to increase the size of the DMA window and thereby increase the efficiency of the DMA memory access.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   an operating system residing in the memory and executed by the at least one processor;
   a hypervisor residing in the memory and executed by the at least one processor that manages a plurality of logical partitions; and
   a dynamic address translation table allocation module (DAAM) residing in the memory and executed by the at least one processor that dynamically changes the allocation of memory to the address translation tables using memory donated from the operating system, wherein the DAAM comprises an OS DAAM residing in the operating system and a hypervisor DAAM residing in the hypervisor.

2. The apparatus of claim 1 wherein the memory donated by the operating system is a logical memory block (LMB).

3. The apparatus of claim 1 wherein the OS DAAM queries the hypervisor for a maximum direct memory access (DMA) window size.

4. The apparatus of claim 3 wherein the OS DAAM determines the maximum DMA window size is not optimal and donates memory to the hypervisor to increase the address translation table size.

5. The apparatus of claim 4 wherein the OS DAAM donates memory by giving a logical memory block to the hypervisor.

6. The apparatus of claim 4 wherein a hypervisor DAAM in the hypervisor updates the size of the address translation table and calculates a new maximum DMA window size.

7. The apparatus of claim 6 wherein the OS DAAM creates a DMA window to maximize the input output performance of an adapter by sending a request to create a DMA window of the maximum size as determined by the hypervisor DAAM.

8. A computer-implemented method for dynamically changing direct memory access window size, the method comprising:
   providing an operating system;
   providing a hypervisor that manages a plurality of logical partitions;
   dynamically changing size of a direct memory access (DMA) window by changing the allocation of memory to an address translation table using memory donated from the operating system to the hypervisor;
   wherein the operating system queries the hypervisor for a maximum direct memory access (DMA) window size;
   wherein the operating system determines the maximum DMA window size is not optimal and donates memory to the hypervisor to increase size of the address translation table; and
   wherein the hypervisor updates the size of the address translation table and calculates a new maximum DMA window size.

9. The method of claim 8 wherein the memory donated by the operating system to the hypervisor is a logical memory block (LMB).

10. The method of claim 8 wherein the operating system creates an DMA window to maximize input output performance of an adapter by sending a request to create a DMA window of the maximum size as determined by the hypervisor.

11. The method of claim 10 wherein the hypervisor determines if the maximum DMA window size is optimal by determining if performance is acceptable with the maximum DMA window size, and where it is determined that performance is not acceptable determining if more memory is available to donate to the hypervisor.

12. A computer-implemented method for dynamically changing direct memory access window size, the method comprising:
   providing an operating system on a processor;
   providing a hypervisor that manages a plurality of logical partitions;
   dynamically changing size of a direct memory access (DMA) window by changing allocation of memory to an address translation table using memory donated from the operating system to the hypervisor comprising:
      the operating system querying the hypervisor for a maximum DMA window size, and if the maximum DMA window size is not optimal the operating system donates memory to the hypervisor to increase size of the address translation table;
      the hypervisor updating the size of the address translation table and calculating a new maximum DMA window size;
      the operating system creating a DMA window to maximize the input output performance of an adapter by sending a request to create a DMA window having the maximum DMA window size determined by the hypervisor; and
   wherein the hypervisor determines if the maximum DMA window size is optimal by determining if performance is acceptable with the maximum DMA window size, and when it is determined that performance is not acceptable, determining if more memory in the operating system is available to donate to the hypervisor.

* * * * *